US008590528B1

(12) United States Patent
Green

(10) Patent No.: US 8,590,528 B1
(45) Date of Patent: Nov. 26, 2013

(54) SOLAR COLLECTOR SYSTEM

(76) Inventor: Robert H. Green, Pawtucket, RI (US)

(*) Notice: Subject to any disclaimer, the term of this patent is extended or adjusted under 35 U.S.C. 154(b) by 51 days.

(21) Appl. No.: 13/349,628

(22) Filed: Jan. 13, 2012

Related U.S. Application Data

(60) Provisional application No. 61/463,511, filed on Feb. 18, 2011.

(51) Int. Cl.
*E04D 13/18* (2006.01)

(52) U.S. Cl.
USPC ........... 126/631; 126/628; 126/629; 126/633; 126/634; 126/648; 126/694

(58) Field of Classification Search
USPC ......... 126/631, 628, 629, 632, 633, 634, 643, 126/684, 690, 692, 694, 583, 617, 648, 704
See application file for complete search history.

(56) References Cited

U.S. PATENT DOCUMENTS

| 4,015,584 | A | * | 4/1977 | Haberman | 126/600 |
| 4,100,914 | A | * | 7/1978 | Williams | 126/631 |
| 4,534,335 | A | * | 8/1985 | Rice | 126/631 |
| 4,552,208 | A | * | 11/1985 | Sorensen | 165/104.22 |
| 5,000,085 | A | * | 3/1991 | Archer | 99/445 |
| 6,014,968 | A | * | 1/2000 | Teoh | 126/639 |

* cited by examiner

*Primary Examiner* — Kenneth Rinehart
*Assistant Examiner* — Bao D Nguyen
(74) *Attorney, Agent, or Firm* — Salter & Michaelson

(57) ABSTRACT

A solar collector system is for support in a building opening to furnish heated air to the interior of the building. The solar collector system includes a collector shell supported at the opening and including a front heating chamber, at least one air intake channel and at least one air outlet channel and a fan disposed within the collector shell for providing a closed loop air circulation from the air intake channel, through the heating chamber and to the air outlet channel. The front heating chamber is defined in part by a parabolic reflector having a focal point facing out from the heating chamber. A heat exchanger is disposed within the parabolic reflector for absorbing solar energy directed to the heating chamber.

20 Claims, 5 Drawing Sheets

SOLAR COLLECTOR SYSTEM

RELATED CASE

Priority for this application is hereby claimed under 35 U.S.C. §119(e) to commonly owned and U.S. Provisional Patent Application No. 61/463,511 which was filed on Feb. 18, 2011 and which is incorporated by reference herein in its entirety.

FIELD OF THE INVENTION

The present invention relates in general to a solar collector system. More particularly, the present invention relates to a solar collector system that is for support in a building opening such as a window opening and constructed and arranged to furnish heated air to the interior of the building.

BACKGROUND OF THE INVENTION

Various types of solar collection systems exist in the prior art. However, there is a need for a solar collector system that can be supported in a building opening for furnishing heated air to the interior of the building. Thus, it is an object of the present invention to provide such a solar collector system. Another objective of the present invention is to provide a solar collector system that is easy to install and that can be manufactured relatively inexpensively. Still another object of the present invention is to provide a solar collector system that can be installed as a free standing unit, or alternatively, can be manufactured as part of the original window structure.

SUMMARY OF THE INVENTION

To accomplish the foregoing and other objects, features and advantages of the present invention there is provided a solar collector system for support in a building opening to furnish heated air to the interior of the building. The solar collector system comprises a collector shell supported at the opening and including a front heating chamber, at least one air intake channel and at least one air outlet channel and a fan disposed within the collector shell for providing a closed loop air circulation from the air intake channel, through the heating chamber and to the air outlet channel. The front heating chamber is defined in part by a parabolic reflector having a focal point facing out from the heating chamber. A heat exchanger is disposed within the parabolic reflector for absorbing solar energy directed to the heating chamber.

In accordance with other aspects of the present invention there is provided a photovoltaic source mounted adjacent to the parabolic reflector and for providing power to the fan; the fan is mounted along the air outlet channel, and the air outlet channel terminates at an outlet port for directing heating air into the building; the collector shell has a pair of spaced apart air intake channels, and the air outlet channel is disposed between the air intake channels, all of the air channels arranged in parallel; including a guide member at an inlet of each air intake channel for directing the air intake; including a heat sink supported along each of the air intake channels; the heat sinks have multiple heat sink plates that are supported in an inverted manner in each air intake channel; including a line of heat sinks disposed along the air outlet channel; including one or more glass plates constructed and arranged over the air intake channel and the air outlet channel; including one or more glass plates constructed and arranged over the parabolic reflector; the parabolic reflector is comprised of a heat reflective layer and a heat insulating layer behind the heat reflective layer; the heat exchanger comprises a metal coil supported within the parabolic reflector; the metal coil is constructed of copper; the metal coil is comprised of a series of metal coils of different diameter with each smaller coil being disposed within an adjacent larger coil; the metal coils have holes therein to assist in heat transfer from the heat exchanger; and each of the different diameter coils are joined at a common tangential location.

In accordance with another version of the present invention there is provided a solar collector system for support in a building opening to furnish heated air to the interior of the building. The solar collector system comprises a collector shell supported at the opening and including a front heating chamber that is positioned to receive solar energy; a pair of spaced apart air intake channel disposed in the collector shell and extending in parallel to a rear of the collector shell; each said air intake channel having an inlet port disposed inside the building and for receiving air to be heated from inside the building; an air outlet channel that is disposed between the air intake channels; said air outlet channel disposed substantially in parallel to the air intake channels and having an inlet port for receiving heated air from the heating chamber; a fan disposed within the collector shell for providing a closed loop air circulation from the air intake channels, through the heating chamber and to the air outlet channel; a parabolic reflector having a focal point facing out from the heating chamber and disposed within the heating chamber; and a heat exchanger disposed within the parabolic reflector for absorbing solar energy directed to the heating chamber.

Other aspects of the present invention include providing a heat sink supported along each of the air intake channels; wherein the heat sinks have multiple heat sink plates that are supported in an inverted manner in each air intake channel; and including a line of heat sinks disposed along the air outlet channel.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
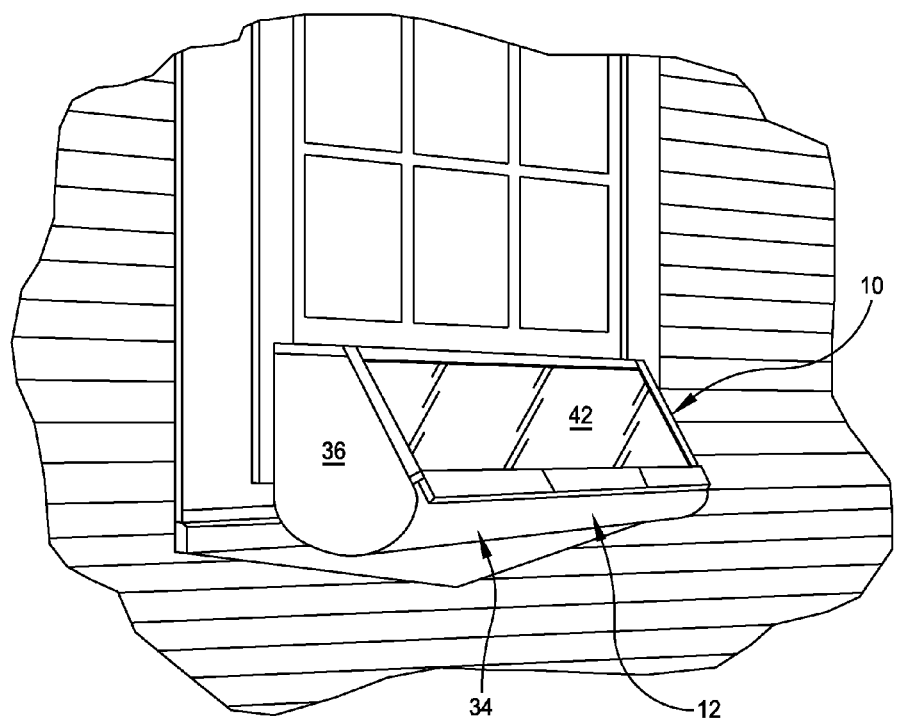
FIG. 1 is a perspective view illustrating the solar collector system of the present invention as installed in a window opening.

The drawings disclose one embodiment of a solar collector system in accordance with the present invention. This is in the form of a concaved and mirrored solar collector which utilizes an aluminized mylar sheet as a reflective surface constructed in an insulated shell that may be also constructed of aluminum, glass, plexiglass and wood. The parabolic shell preferably has two layers of tempered glass installed to serve as a heat trap. The reflective surface focuses sunlight on to a rolled tubular coil that is constructed of a thin sheet of copper rolled into a coil. The coiled copper sheet metal functions as a heat absorber and heat exchanger. The coil copper sheet is preferably perforated. This construction allows cool circulating room air to enter the absorber/exchanger and exit as warm air that is coupled into the interior of the room being heated. The heating process is facilitated as ambient air enters the collector at each end through channels that preferably also include extruded heat sinks that are mounted in an inverted manner so as to have maximum exposure to the sun. This arrangement serves to preheat incoming air before reaching the main heat absorber. Heated air is then forced to exit the collector from a central air channel and air port into the space to be heated. The solar collector also employs the use of a photovoltaic module that provides DC power to operate a small fan for circulating warm air into the living space. The collector is designed to function as a stand-alone window mounted passive heat exchanger unit, to provide warm air to a living space when there is available sunlight.

As is illustrated in the drawings herein, the collector is adapted to be installed in most double-hung windows. The collector preferably is disposed in windows, or possibly other openings in the building, so that the collector is south facing providing optimum exposure for usable sunlight. However, east and west facing windows can also offer at least limited sunlight exposure. The solar collector unit once installed uses a relatively small proportion of the overall window opening. In one embodiment the unit uses only 4½ inches of the actual inside window profile. The primary collector shell of the solar collector is mounted outside of the window on the window sill sloping away from the window such as at a 55 degree angle.

Figure 2:
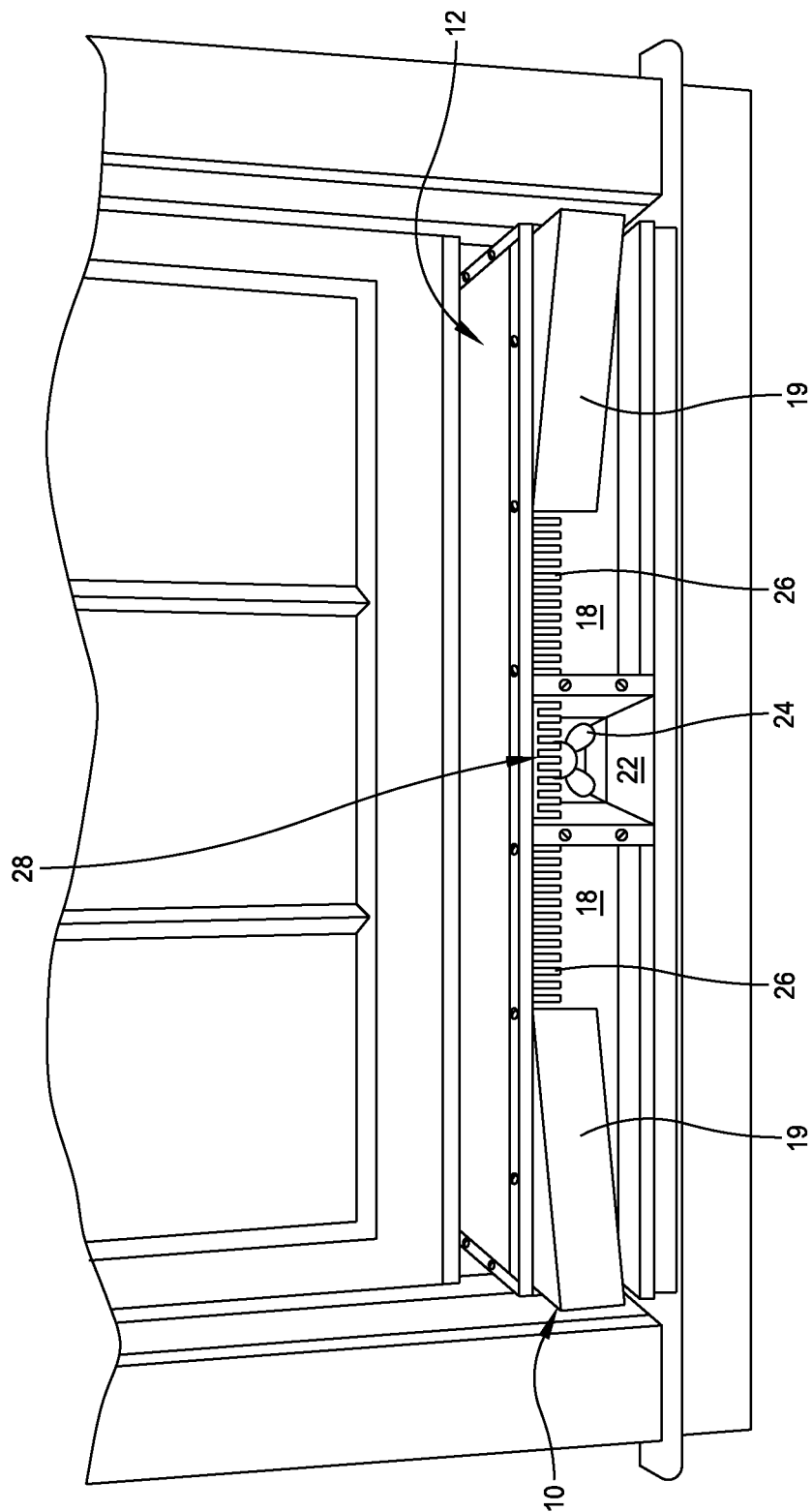
FIG. 2 is a perspective view taken inside the building illustrating the inside structure of the solar collector system.

Reference is now made to the perspective view of FIGS. 1 and 2 which show the solar collector 10 at the respective outside and inside of the window opening. The solar collector 10 can be conveniently located in the window opening with the outer portion of the solar collector supported on the window sill. Some addition support may also be provided on the outside of the building to properly support the entire solar collector. FIG. 2 illustrates the position of the solar collector 10 from inside the building. FIG. 2 also illustrates the position of the window which may be pressed down against a top surface of the solar collector.

Figure 4:
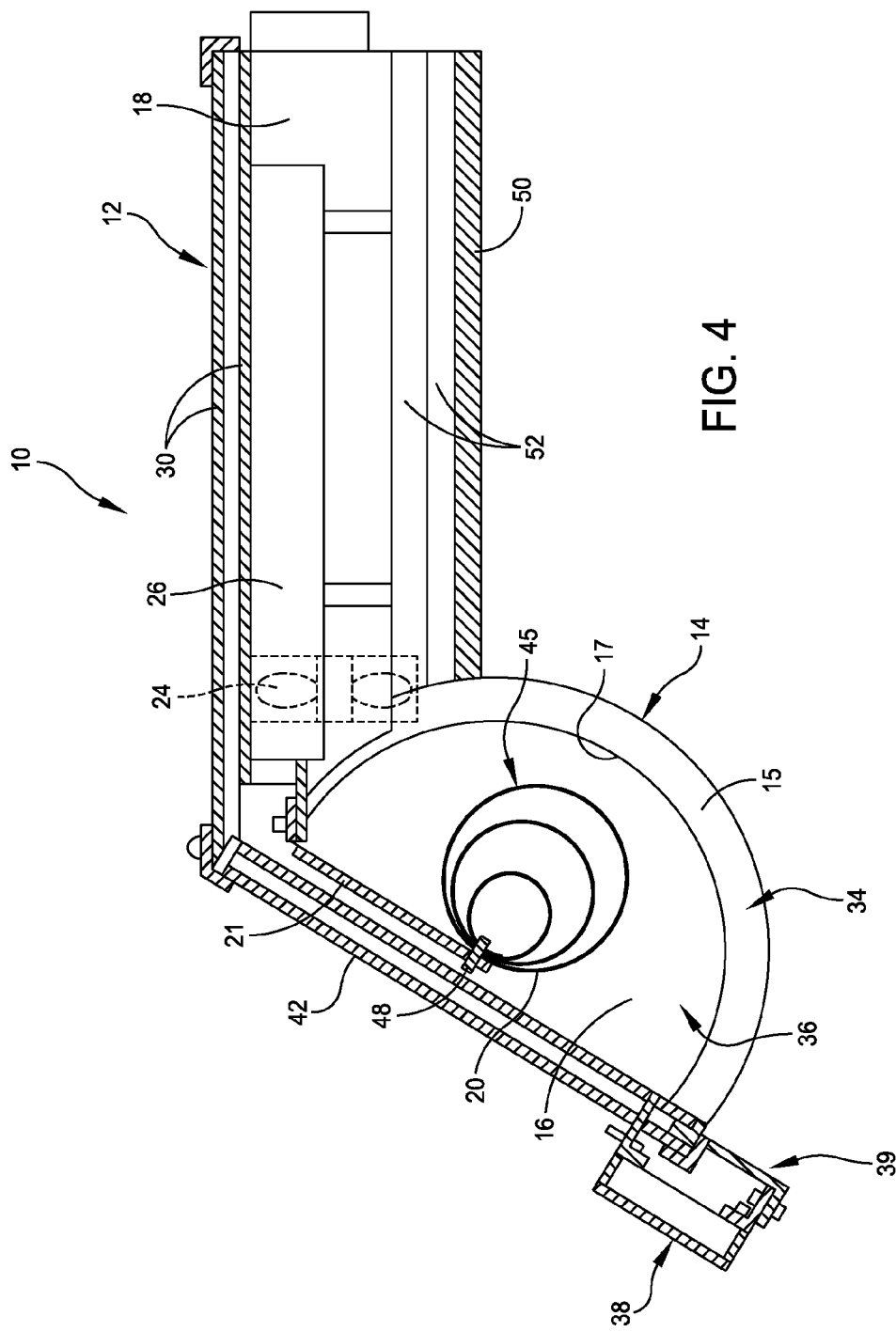
FIG. 4 is a cross-sectional view through the solar collector system as taken along line 4-4 of FIG. 3.

The solar collector 10 is in the form of a collector shell 12. The shell 12 may be constructed of a variety of different materials and may be primarily constructed of sheet aluminum with some wood support. Refer to the cross-sectional view of FIG. 4 showing the aluminum sheet metal 14. Part of the aluminum sheet material forms the parabolic shape.

The collector shell 12 is supported at the window opening and includes a front heating chamber 16 that is positioned to receive solar energy and that contains the heat exchanger 20. The collector shell 12 also includes a pair of spaced apart air intake channels 18. At the input to each of these channels 18, such as is illustrated in FIG. 2, there may be provided wedge-shaped or arcuate-shaped guide members 19. These guide members assist in funneling the input air into each of the spaced apart air intake channels 18. Disposed between the channels 18 is the return air outlet channel 22. Preferably, the intake channels are wider than the air outlet. As illustrated in, for example, FIG. 3, the channels 18 and 22 may all be considered as extending in parallel to each other.

A fan 24 is disposed at some location along the outlet channel 22. The fan 24 provides a closed loop air circulation from the air intake channels, through the heating chamber 16 and to the single air outlet channel 22. The fan 24 may be disposed at virtually any location along the outlet channel 22.

Figure 3:
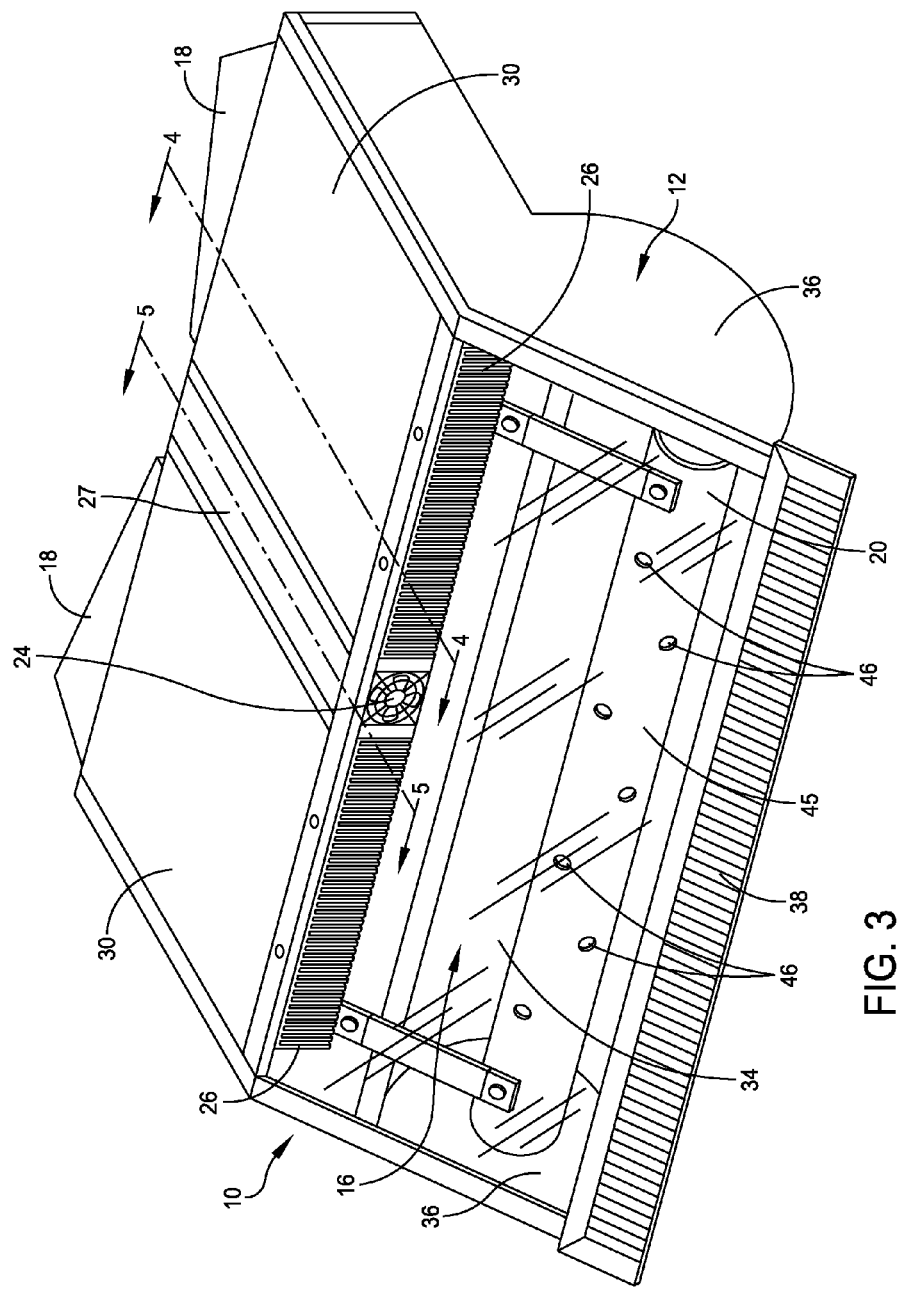
FIG. 3 is a front perspective view of the solar collector system of the present invention.
Figure 5:
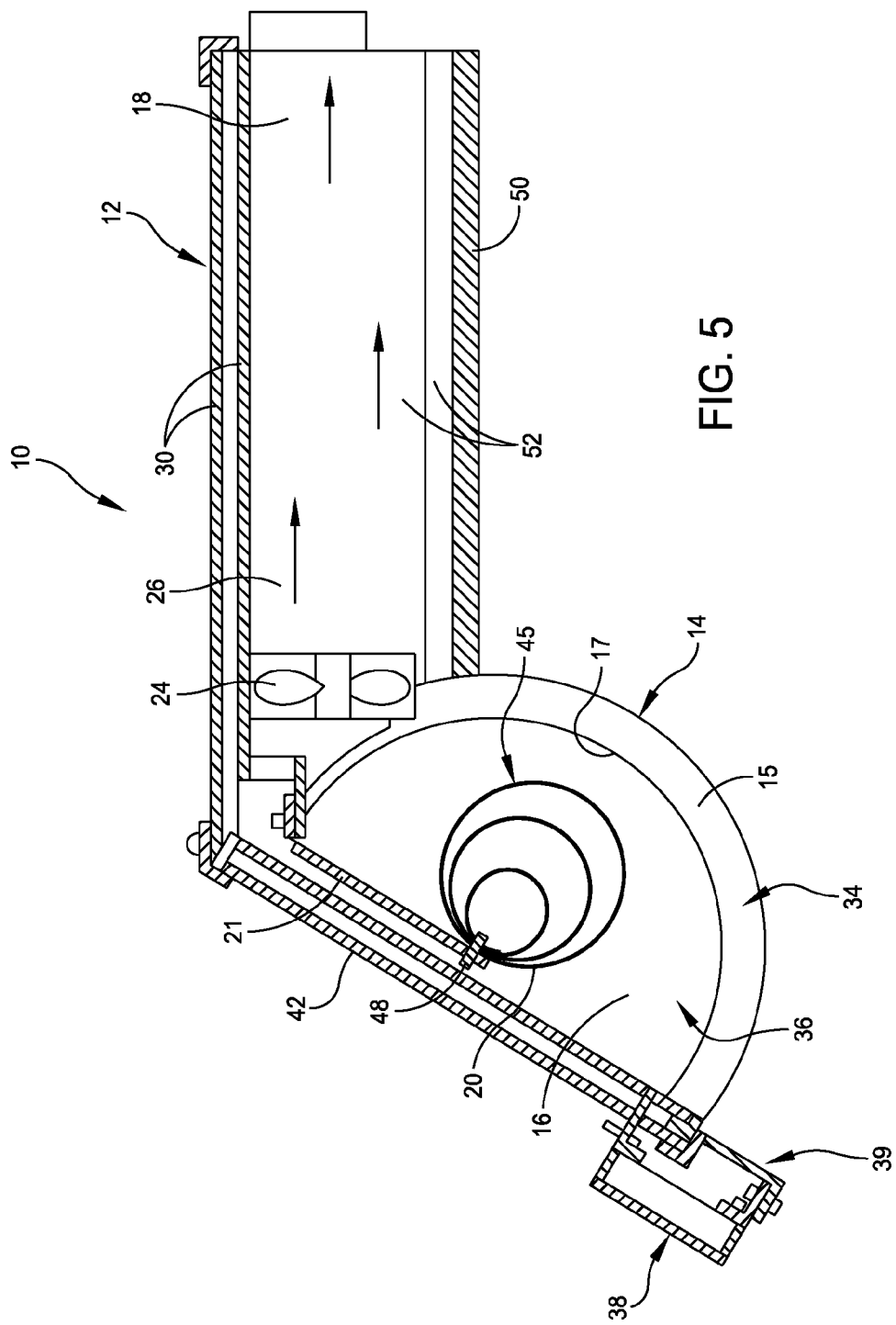
FIG. 5 is a cross-sectional view of the solar collector system as taken along line 5-5 of FIG. 3.

Each of the air channels has associated therewith, and mounted therein, a heat sink. This includes heat sinks 26 disposed in each of the intake channels 18, as well as a heat sink 28 disposed within the air outlet channel 22. All of the heat sinks are preferably inverted so that the fins are directed downwardly as illustrated in FIGS. 2 and 3. As illustrated in FIGS. 4 and 5, there are a pair of fiberglass sheets 30. Each of these sheets are disposed in parallel to each other and each of the plexiglass sheets may be ⅛ inch in thickness. These plexiglass sheets 30 overly the heat sinks. These plexiglass sheets permit a substantial amount of solar energy to traverse therethrough for heating the heat sinks.

Within the front portion of the shell 12, such as depicted in FIGS. 3 and 4, there is formed a parabolic reflector 34. In addition to the parabolic reflective surface, there are also preferably end reflector surfaces 36 that can be partially arcuate to provide some additional solar energy reflection. At the very front of the parabolic reflector 34 there is provided a photovoltaic power source 38. Brackets are shown at 39 for mounting the photovoltaic power source at the lower front of the parabolic reflector. These photovoltaic cells are also shown at 38 in FIG. 3. The parabolic reflector 34 may be considered as forming part of the heating chamber 16.

A heat exchanger 20 is supported symmetrically within the heating chamber 16. For this purpose, there is provided a mounting bar 21, as illustrated in FIG. 4. The heat exchanger is disposed within the parabolic reflector for absorbing solar energy directed to the heating chamber. At the front of the heating chamber, there is preferably provided two glass panels 42. Each of these glass panels may have a thickness of ⅛ inch.

The parabolic reflector 34 may be considered as comprised of multiple layers. This includes an outer aluminum metal sheet 14, a foam insulation layer 15 and a mirrored mylar reflector layer 17. The layer 17 is the primary reflective surface for reflecting solar rays to the heat exchanger 20. The heat exchanger 20 comprises a metal coil 45 supported within the heating chamber and comprised of a series of metal coils of different diameter as illustrated in FIG. 4. Each of the coils is disposed within an adjacent larger coil. The coils are connected at the free end of the mounting bracket 21 at location 48 so that all of the coils are tangent to each other at that location and are secured together at that same location 48. Preferably, all of the coils, particularly the larger diameter coil is provided with perforations 46 as shown in FIG. 3. These perforations assist in the movement of heated air through the heat exchanger. Each of the coils of the heat exchanger may be formed from a single coiled member constructed of copper or other heat conductive material.

When there is sufficient solar energy available, the fan 24 operates so that there is a circulation of air from the air intake ports to the heating chamber. The air is heated as it progresses past the heat sinks 26 and is furthermore heated to a maximum temperature within the heating chamber 16. Solar energy is directed to the reflective parabolic surface 17 and from there to the heat exchanger coils 45. As the air is circulated into the heating chamber 16, it is further heated and exhausted by means of the fan 24 to the outlet channel 22. From there, the heated air is directed into the room. Refer to FIG. 2.

The lower portion of the air channels may also be formed by means of a plywood layer 50 having on the outside thereof one of the sheets of aluminum forming sheets of the shell. Above the plywood sheet 50 there is preferably provided one or more foam insulation sheets 52. This prevents heat loss as the air is circulated through the intake channels.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A solar collector system for support in a building opening to furnish heated air to the interior of the building, said solar collector system comprising:
   a collector shell supported at the opening, constructed and arranged to be disposed outside the building, and including a front heating chamber;
   a pair of air intake channels and an air outlet channel, said channels all being disposed substantially in parallel and all extending through said building opening from said front heating chamber to the interior of the building;
   a fan disposed for providing a closed loop air circulation from the air intake channels, through the heating chamber and to the air outlet channel;
   said front heating chamber defined in part by a parabolic reflector having a focal point facing out from the heating chamber and a front plate through which the solar energy passes; and
   a heat exchanger disposed within the heating chamber and disposed in the vicinity of the focal point of the parabolic reflector for absorbing solar energy directed to the heating chamber.

2. The solar collector system of claim 1 including a photovoltaic source mounted adjacent to the parabolic reflector and for providing power to the fan.

3. The solar collector system of claim 1 wherein the fan is mounted within and along the air outlet channel that extends through the building opening from the front heating chamber to the interior of the building, and the air outlet channel terminates at an outlet port for directing heating air into the building.

4. The solar collector system of claim 3 wherein the air outlet channel is disposed between the air intake channels.

5. The solar collector system of claim 4 including a guide member at an inlet of each air intake channel for directing the air intake.

6. The solar collector system of claim 4 including a heat sink supported along each of the air intake channels.

7. The solar collector system of claim 6 wherein the heat sinks have multiple heat sink plates that are supported in an inverted manner in each air intake channel.

8. The solar collector system of claim 7 including a line of heat sinks disposed along the air outlet channel.

9. The solar collector system of claim 1 including one or more glass plates constructed and arranged over the air intake channel and the air outlet channel.

10. The solar collector system of claim 1 wherein the front plate includes one or more glass plates constructed and arranged over the parabolic reflector.

11. The solar collector system of claim 1 wherein the parabolic reflector is comprised of a heat reflective layer and a heat insulating layer behind the heat reflective layer.

12. The solar collector system of claim 1 wherein the heat exchanger comprises a metal coil supported within the parabolic reflector.

13. The solar collector system of claim 12 wherein the metal coil is constructed of copper.

14. The solar collector system of claim 12 wherein the metal coil is comprised of a series of metal coils of different diameter with each smaller coil being disposed within an adjacent larger coil.

15. The solar collector system of claim 14 wherein the metal coils have holes therein to assist in heat transfer from the heat exchanger.

16. The solar collector system of claim 14 wherein each of the different diameter coils are joined at a common tangential location.

17. A solar collector system for support in a building opening to furnish heated air to the interior of the building, said solar collector system comprising:
   a collector shell supported at the opening and including a front heating chamber that is positioned to receive solar energy;
   a pair of spaced apart air intake channel disposed in the collector shell and extending in parallel to a rear of the collector shell;
   each said air intake channel having an inlet port disposed inside the building and for receiving air to be heated from inside the building;
   an air outlet channel that is disposed between the air intake channels;
   said air outlet channel disposed substantially in parallel to the air intake channels and having an inlet port for receiving heated air from the heating chamber;
   all said air channels extending through said building opening from said front heating chamber to the interior of the building;
   a fan disposed for providing a closed loop air circulation from the air intake channels, through the heating chamber and to the air outlet channel;
   said front heating chamber defined in part by a parabolic reflector having a focal point facing out from the heating chamber and a front plate through which solar energy passes; and
   a heat exchanger disposed within the heating chamber in the vicinity of the focal point of the parabolic reflector for absorbing solar energy directed to the heating chamber.

18. The solar collector system of claim 17 including a heat sink supported along each of the air intake channels.

19. The solar collector system of claim 18 wherein the heat sinks have multiple heat sink plates that are supported in an inverted manner in each air intake channel.

20. The solar collector system of claim 19 including a line of heat sinks disposed along the air outlet channel.

* * * * *